(12) United States Patent
Anderton et al.

(10) Patent No.: US 9,764,642 B2
(45) Date of Patent: Sep. 19, 2017

(54) ERGONOMIC ADJUSTMENT SYSTEM FOR OPERATOR STATION

(71) Applicant: Caterpillar Global Mining America LLC, Houston, PA (US)

(72) Inventors: Jonathan Anderton, Peoria, IL (US); Gregory Kopp, Dunlap, IL (US); Joseph Every, Peoria, IL (US); Randall E. Davis, East Peoria, IL (US)

(73) Assignee: Caterpillar Global Mining America LLC, Houston, PA (US)

( * ) Notice: Subject to any disclaimer, the term of this patent is extended or adjusted under 35 U.S.C. 154(b) by 60 days.

(21) Appl. No.: 14/928,852

(22) Filed: Oct. 30, 2015

(65) Prior Publication Data

US 2017/0120751 A1 May 4, 2017

(51) Int. Cl.
*B60J 7/00* (2006.01)
*B60K 37/06* (2006.01)
*B62D 33/06* (2006.01)

(52) U.S. Cl.
CPC .............. *B60K 37/06* (2013.01); *B62D 33/06* (2013.01); *B60K 2350/1048* (2013.01); *B60K 2350/405* (2013.01); *B60K 2350/407* (2013.01)

(58) Field of Classification Search
CPC ........... B65H 2511/13; B65H 2513/104; A63F 2300/407; B60J 5/06; C12Q 1/6851; A61M 25/104; A61M 2025/0183; A61M 2025/0025; A61M 2025/0047
USPC .................................................... 296/190.08
See application file for complete search history.

(56) References Cited

U.S. PATENT DOCUMENTS

| | | | |
|---|---|---|---|
| 4,646,869 A * | 3/1987 | Kerner, Jr. ............. | B60K 26/00 180/334 |
| 4,682,787 A | 7/1987 | Ruhter et al. | |
| 5,502,616 A | 3/1996 | Maguire, Jr. | |
| 6,000,296 A * | 12/1999 | Sundquist .............. | B60K 20/04 180/233 |
| 6,450,284 B1 * | 9/2002 | Sakyo ...................... | E02F 9/16 180/329 |
| 6,629,572 B2 | 10/2003 | Womer et al. | |
| 6,715,269 B2 | 4/2004 | Nanlawala et al. | |
| 7,121,608 B2 * | 10/2006 | Billger ................... | B60N 2/002 180/329 |
| 7,520,567 B2 * | 4/2009 | Billger ..................... | A47C 3/18 180/330 |

(Continued)

FOREIGN PATENT DOCUMENTS

WO 2009010818 1/2009

*Primary Examiner* — Kiran B Patel
(74) *Attorney, Agent, or Firm* — Miller, Matthias & Hull

(57) ABSTRACT

An operator station includes a console, a rail, a slider assembly, a suspension mechanism, a platform, a display mounting assembly, and a display. The console includes a lever and at least one locking pin. The rail selectively engages with the lever. The slider assembly slidably engages with the rail. The suspension mechanism operatively associates with the slider assembly and with the rail. The platform operatively associates with the slider assembly, tiltably associates with the console, and slidably selectively engages with the at least one locking pin. The display mounting assembly operatively associates with the slider assembly. The display operatively associates with the display mounting assembly.

10 Claims, 11 Drawing Sheets

(56) References Cited

U.S. PATENT DOCUMENTS

| | | | |
|---|---|---|---|
| 8,104,566 B2* | 1/2012 | Harber | B60N 2/4606 |
| | | | 180/315 |
| 8,388,262 B2 | 3/2013 | Klein et al. | |
| 8,465,094 B2 | 6/2013 | Wada | |
| 8,483,914 B2 | 7/2013 | Copeland et al. | |
| 8,505,646 B2 | 8/2013 | Yamamoto | |
| 8,651,220 B2 | 2/2014 | Connor et al. | |
| 9,026,312 B2 | 5/2015 | Smith et al. | |
| 9,213,333 B2* | 12/2015 | Harrison | G05D 1/0038 |
| 2004/0011015 A1* | 1/2004 | Nanlawala | A01D 41/12 |
| | | | 56/10.2 R |
| 2006/0042857 A1* | 3/2006 | Catton | B60N 2/4693 |
| | | | 180/334 |
| 2006/0052140 A1* | 3/2006 | Hicks, III | H04L 63/0853 |
| | | | 455/569.1 |
| 2006/0201732 A1* | 9/2006 | Dunn | B62D 49/0685 |
| | | | 180/331 |
| 2006/0229770 A1* | 10/2006 | Strong | B60N 2/005 |
| | | | 701/1 |
| 2007/0144133 A1* | 6/2007 | Drake | A01D 34/82 |
| | | | 56/323 |
| 2008/0023250 A1 | 1/2008 | Hefner et al. | |
| 2008/0070227 A1* | 3/2008 | Rauch | G09B 9/00 |
| | | | 434/379 |
| 2008/0252114 A1* | 10/2008 | Kim | B60N 2/06 |
| | | | 297/216.15 |
| 2010/0026026 A1* | 2/2010 | Akahane | E02F 9/166 |
| | | | 296/24.34 |
| 2010/0057307 A1* | 3/2010 | Copeland | B60N 2/0232 |
| | | | 701/50 |
| 2010/0102609 A1* | 4/2010 | Confer | B60N 2/24 |
| | | | 297/335 |
| 2010/0251682 A1* | 10/2010 | Eick | A01D 41/14 |
| | | | 56/11.2 |
| 2010/0300796 A1* | 12/2010 | Ryan | B60K 26/00 |
| | | | 180/329 |
| 2012/0325961 A1* | 12/2012 | Werjefelt | B64D 25/00 |
| | | | 244/118.5 |
| 2015/0210263 A1* | 7/2015 | Anderson | B60W 10/06 |
| | | | 701/54 |

* cited by examiner

ERGONOMIC ADJUSTMENT SYSTEM FOR OPERATOR STATION

FIELD OF THE DISCLOSURE

The present disclosure relates generally to machines and, more particularly, to operator stations of construction machines.

BACKGROUND OF THE DISCLOSURE

Construction and earth-moving machines are often equipped with operator stations. Such machines may be used to move materials such as soil, rock, gravel, sand, asphalt, and the like during the construction or maintenance of paved surfaces, building sites, landscapes, mines, or other areas. For example, an operator may use the operator station to control the movements of construction and earth-moving machines to drill rock, excavate earth, transport earth and/or building materials, smooth and grade surfaces, and demolish old structures. Typically, such machines include a chassis which supports an engine and an operator cab. The operator station may be disposed in the operator cab and may include machine input controls.

During a work cycle, different operators of varying statures may use the operator station. Also during a work cycle, an operator may become uncomfortable while using the operator station. For instance, an operator station may be configured so that its height does not match the height of the operator, and its controls do not match the operator's desired hand position. Such uncomfortable heights and positions may eventually frustrate and prematurely fatigue the operator. This situation may result in an injury to the operator, an incorrect command to the machine, or an incorrect operation to a worksite. Otherwise, operators may be monitored and preventively removed from the machine before they become overly frustrated or fatigued, sometimes resulting in a work stoppage when operators change. An incorrect command to the machine by a fatigued operator may also result in damage to the machine.

Operator stations with some degree of ergonomic adjustment are available. Such operator stations are often arranged with multi-directionally adjustable control pods. More specifically, the control pods are equipped with bearings and swivels to allow fore/aft and inboard/outboard movements of the control pods. However, these efforts to provide ergonomic adjustment to operator stations to increase operator comfort have been found largely lacking. It has been found that operators also desire operator stations with vertical adjustment. One example of an existing strategy for attempting to improve operator comfort is shown by Connor in U.S. Pat. No. 8,651,220.

It can therefore be seen that improvements in the arrangement of the operator station and associated structures are desired to increase operator comfort. Furthermore, increased operator comfort may aid in preventing accidents, increasing work efficiency, and reducing cost.

SUMMARY OF THE DISCLOSURE

In accordance with one embodiment, an operator station is disclosed. The operator station may include a console, a rail, a slider assembly, a suspension mechanism, a platform, a display mounting assembly, and a display. The console may include a lever and at least one locking pin. The rail may selectively engage with the lever. The slider assembly may be slidably engaged with the rail. The suspension mechanism may be operatively associated with the slider assembly and with the rail. The platform may be operatively associated with the slider assembly, tiltably associated with the console, and slidably selectively engaged with the at least one locking pin. The display mounting assembly may be operatively associated with the slider assembly. The display may be operatively associated with the display mounting assembly.

In accordance with another embodiment, a machine having a chassis, at least one work implement, and at least one operator station is disclosed. The chassis may support the at least one work implement and the at least one operator station. The operator station may include a display, display mounting assembly, a slider plate, a platform, a slider block, a rail, a spring strut, a damper, and a console. The display mounting assembly may be operatively associated with the display. The slider plate may be operatively associated with the display mounting assembly, the platform, and the slider block. The rail may be slidably associated with the slider block and the slider plate. The spring strut and the damper may both be operatively associated with the slider block and the rail. The console may be tiltably associated with the platform, may have a lever selectively engaged with the rail, and may further have at least one locking pin selectively slidably engaged with the platform.

In accordance with yet another embodiment, a method for customizing an operator station of a machine, the operator station having a console, a display, a slider assembly, and a rail, is disclosed. The method may include adjusting a pose of the display by tilting the display relative to the slider assembly. The method may also include adjusting a position of the console by tilting the console relative to the slider assembly. The method may further include adjusting a height of the display and the console by vertically displacing the slider assembly relative to the rail.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
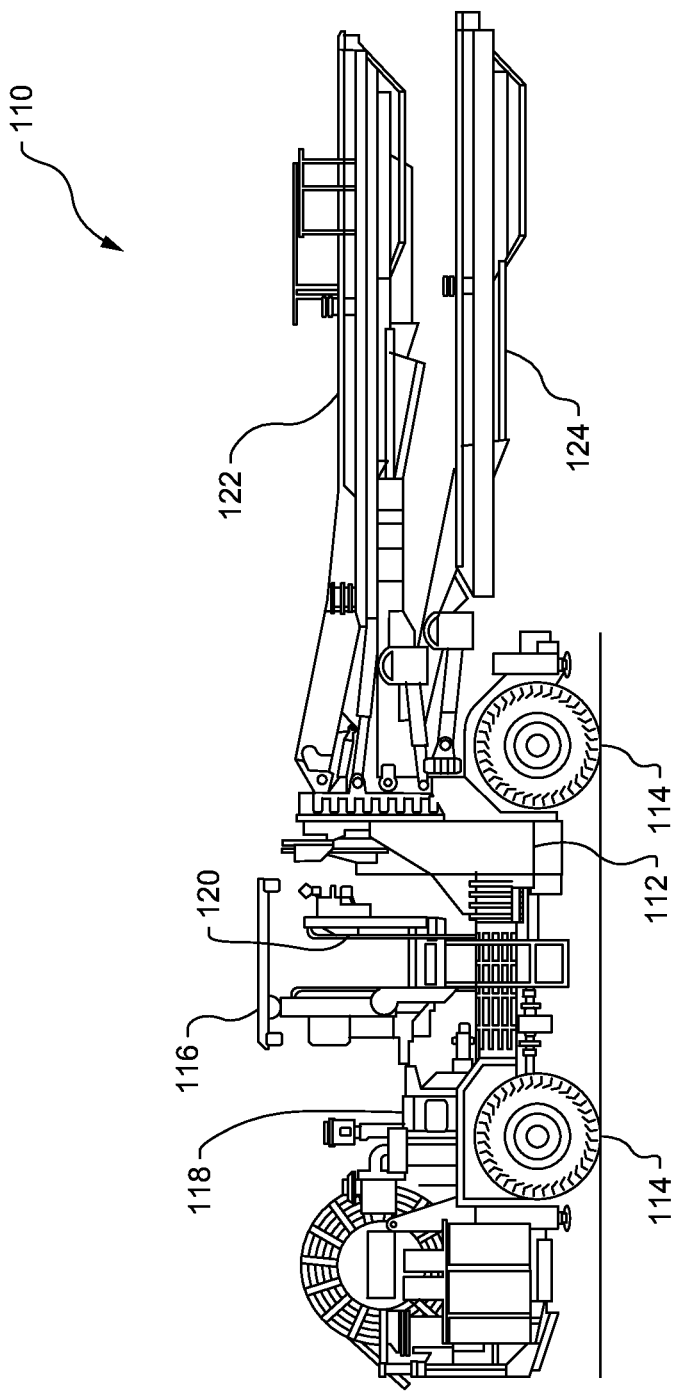
FIG. 1 is a side view of a machine, in accordance with an embodiment of the present disclosure.

Referring now to the drawings and with specific reference to FIG. 1, a machine consistent with certain embodiments of the present disclosure is generally referred to by reference numeral 110. It is to be understood that although the machine is depicted in FIG. 1 as a mining drill, the teaching of the present disclosure can be employed with equal efficacy in connection with many other types of machines used in construction and earth moving applications including but not limited to excavators, bulldozers, graders, pipelayers, and the like.

The machine 110 may include a chassis 112 supported by wheels 114. The chassis 112 may support, an operator cab 116, an engine 118, an operator station 120, and at least one work implement 122. In the depicted embodiment, two mining drills and support arms are provided as implements 122, 124, but it is to be understood that other implements such as, but not limited to, bulldozer blades, augers, fork lifts, excavators, and the like are possible. Through the operator station 120, a user may control the work implements 122, 124. In some embodiments, the operator station 120 may control both of the work implements 122, 124 simultaneously. In other embodiments, the operator station 120 may be ergonomically adjustable to accommodate users of differing statures and users' differing stances during a work cycle. The ergonomic adjustment structures of the operator station 120 are described more fully below in conjunction with FIGS. 2-10.

Figure 2:
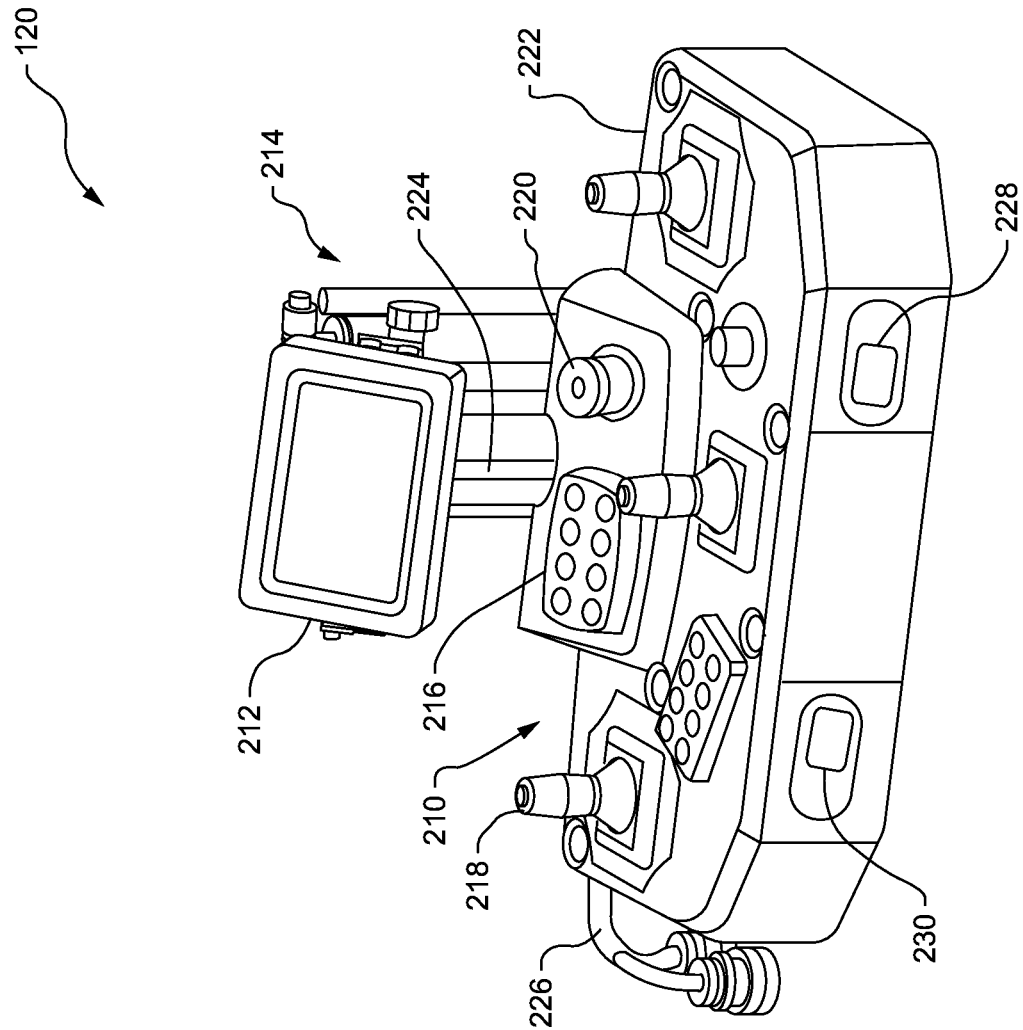
FIG. 2 is a perspective view of an operator station of the machine, in accordance with an embodiment of the present disclosure.

Looking at FIG. 2, the operator station 120 may include a console 210, a display 212, and a support assembly 214. The console 210 and the display 212 may be operatively associated with the support assembly 214, as will be described below and shown in FIGS. 3-9. The console 210 may include at least one control pad 216, at least one joystick 218, at least one selector knob 220, a cover 222, a display wire harness 224, a data wire harness 226, a vertical adjustment finger lever 228, and a console tilt adjustment finger lever 230. The cover 222 may protect additional structures of the console 210 which will be described below and are better shown in FIGS. 4-7. The data wire harness 226 may connect to additional electronics of the machine to control the work implements 122, 124 and, as more fully described by FIG. 3 below, the display wire harness 224 may connect to the display 212 to provide information about the machine 110 to a user.

Figure 3:
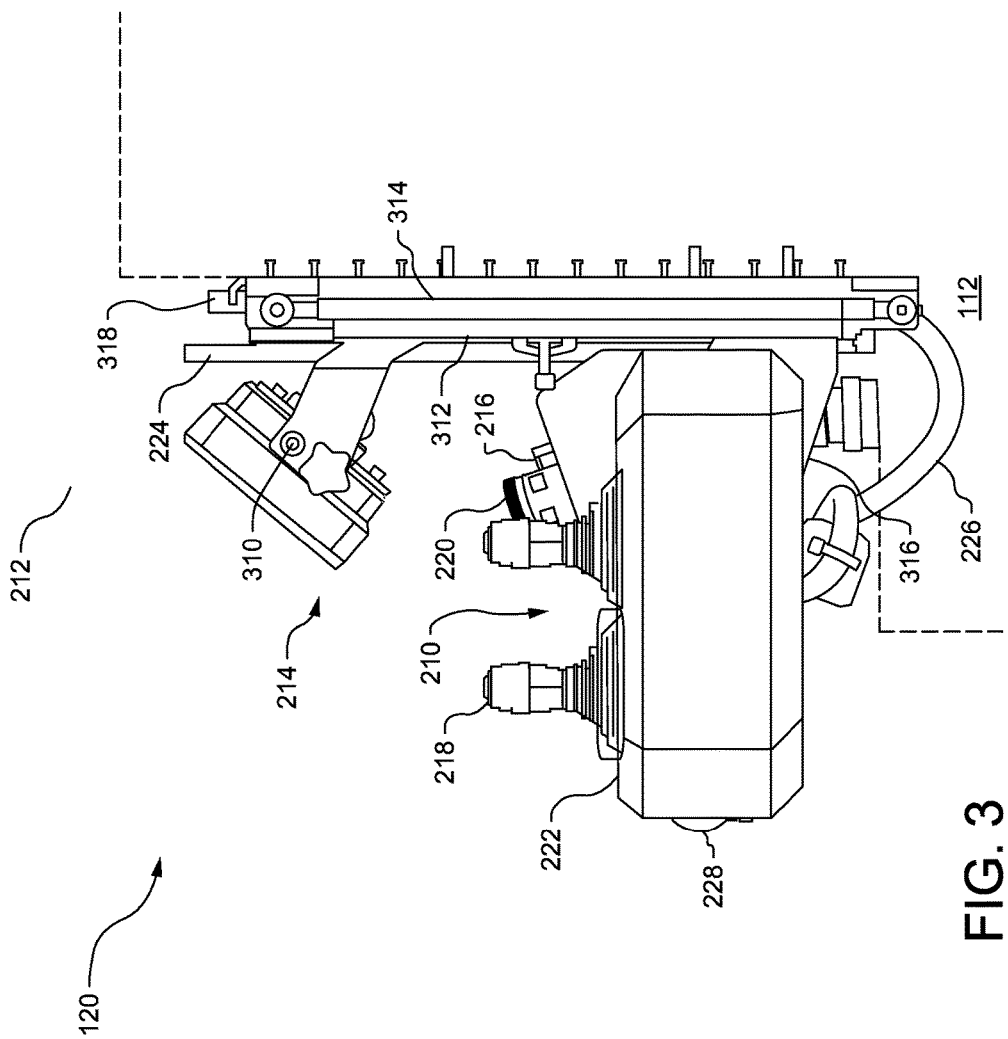
FIG. 3. is a side view of an operator station of the machine, in accordance with an embodiment of the present disclosure.

Turning to FIG. 3, the display wire harness 224 may electrically connect the display 212 to the console 210 and the data wire harness 226 may electrically connect the console 210 to other electronics housed in the chassis 112, shown in phantom. The support assembly 214 may include a display mounting assembly 310, a slider assembly 312, a suspension mechanism 314, a platform 316, and a rail 318. The display mounting assembly 310 may be operatively associated with and may provide angular tilting adjustment to the display 212. The supporting structures of and connections between the display mounting assembly 310 and the display 212 are more fully described by FIG. 9 below. In some embodiments, the display mounting assembly 310 may be further operatively associated with the slider assembly 312. In other embodiments, the display mounting assembly 310 may be slidably engaged with the slider assembly 312. The slider assembly 312 may be further slidably engaged with the rail 318 and may be operatively associated with the platform 316 and the suspension mechanism 314. Additionally, the rail 318 may be operatively associated with the chassis 112 and the suspension mechanism 314. Thus, the suspension mechanism 314 may moderate vertical adjustment of the console 210 and the display 212 with respect to the chassis 112. In some embodiments, vertical adjustment of the console 210 and the display 212 may be mutually dependent. In other embodiments, vertical adjustment of the console 210 and the display 212 may be independent. Along the same lines, the platform 316 may be tiltably engaged with the console 210 to provide angular tilting adjustment of the console 210 with respect to the support assembly 214. In some embodiments, angular tilting adjustment of the console 210 and the display 212 may be mutually dependent. In other embodiments, angular tilting adjustment of the console 210 and the display 212 may be independent. The supporting structures and connections between the console 210 and the support assembly 214 are more fully described by FIGS. 4-10 below.

Figure 4:
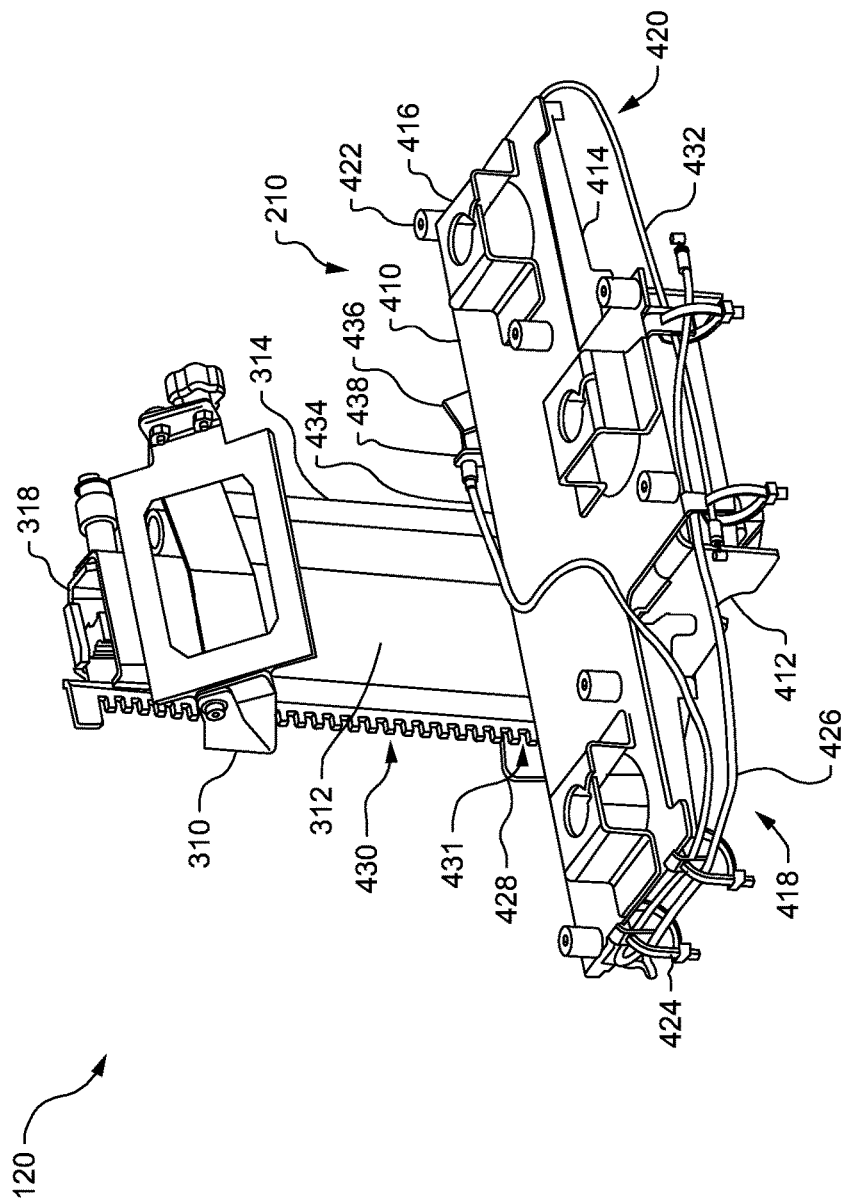
FIG. 4 is a perspective view of the operator station of the machine of FIG. 2 with the cover removed, in accordance with an embodiment of the present disclosure.

Looking now at FIG. 4, the console 210 may further include a plate 410, first and second stiffening brackets 412, 414, at least one joystick mount 416, a vertical adjustment assembly 418, a console tilt adjustment assembly 420, at least one cover mount 422, and at least one retainer tie 424. The plate 410 may be operatively associated with the first and second stiffening brackets 412, 414, the at least one joystick mount 416, and the at least one cover mount 422. Referring back to FIG. 2, in some embodiments, joysticks 218 may be modular and removably engaged with joystick mounts 416. The first and second stiffening brackets 412, 414 may support the vertical adjustment assembly 418 and the console tilt adjustment assembly 420. The at least one retainer tie 424 may further support, route, and tidy the vertical adjustment assembly 418 and the console tilt adjustment assembly 420.

More specifically, the vertical adjustment assembly 418 may include a first pull cable 426, and a lever 428. As best shown in FIG. 4, the lever 428 and the rail 318 may selectively engage. In some embodiments, the lever 428 may be pawl formed and the rail 318 may have a first plurality of teeth 430 which may ratchetingly engage with the lever 428. In further embodiments, the lever 428 may have a second plurality of teeth 431 which may matingly engage with the first plurality of teeth 430. Similar to the vertical adjustment assembly 418, the console tilt adjustment assembly 420 may include second and third pull cables 432, 434 as well as a yoke 436 and a yoke bracket 438. Additional structures of and connections between the vertical adjustment assembly 418, the console tilt adjustment assembly 420, the console 210, and the support assembly 214 are more completely illustrated by FIGS. 5-7 and will be described below.

Figure 5:
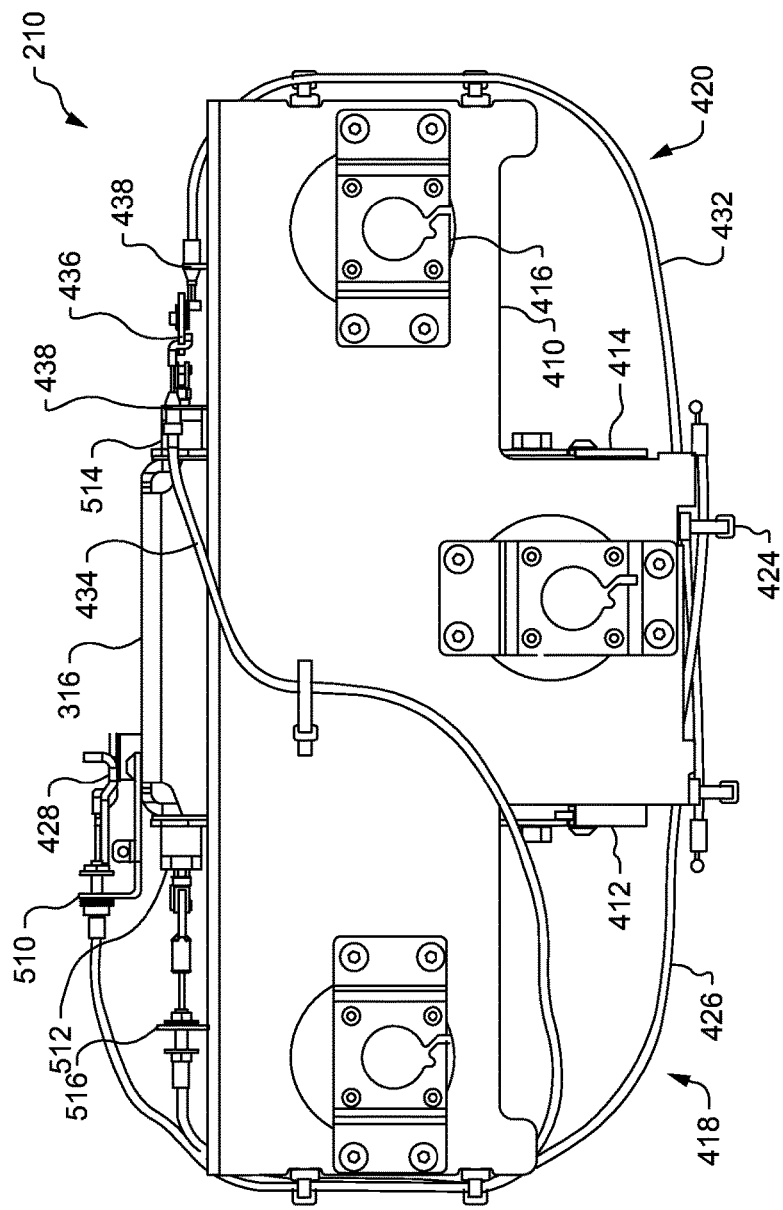
FIG. 5. is a top view of the console of the operator station of the machine of FIG. 2 with the cover removed, in accordance with an embodiment of the present disclosure.

Now visible in FIG. 5, the vertical adjustment assembly 418 further includes a vertical adjustment bracket 510 which may support the first pull cable 426. The first pull cable 426 may be operatively associated with the vertical adjustment finger lever 228, shown previously in FIG. 2, and with the lever 428. Thus, actuation of the vertical adjustment finger lever 228 may be transmitted to the lever 428 via the first pull cable 426 and may disengage the lever 428 from the rail 318 to allow simultaneous vertical adjustment of the console 210 and the display 212.

Also visible in FIG. 5, the console tilt adjustment assembly 420 may further include first and second locking pins 512, 514 and a console tilt bracket 516 which may support the third pull cable 434. The third pull cable 434 may be further supported by the yoke bracket 438 and may be operatively associated with the first locking pin 512 and the yoke 436. The yoke 436 may also be supported by the yoke bracket 438 and may in turn be operatively associated with the second pull cable 432 and the second locking pin 514. The second pull cable 432 may be supported by the yoke bracket 438 as well and may further be operatively associated with console tilt adjustment finger lever 230, previously shown in FIG. 2. Additionally, both the first and second locking pins 512, 514 may be selectively slidably engaged with the platform 316. In some embodiments, the first and second locking pins 512, 514 may be spring-loaded and may be biased to slidably engage with the platform 316. Thus, via the second and third pull cables 432, 434 and the yoke 436, actuation of the console tilt adjustment finger lever 230 may be transmitted simultaneously to the first and second locking pins 512, 514 and may disengage the first and second locking pins 512, 514 from the platform 316 to allow tilting adjustment of the console 210. The sliding engagement between the first and second locking pins 512, 514 and the tilting engagement between the console 210 and the platform 316 are more fully explained by FIG. 6 below.

Figure 6:
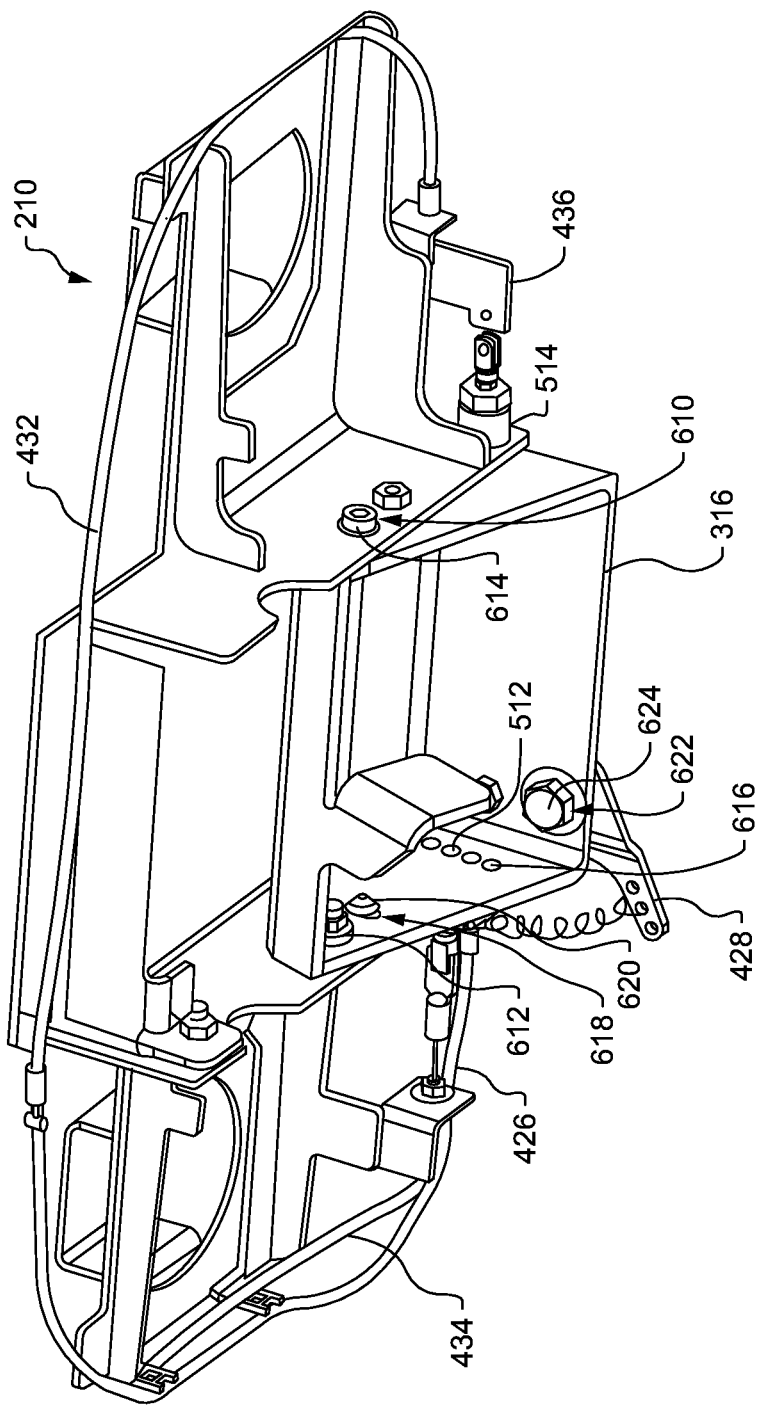
FIG. 6 is a perspective view of a console of the operator station of the machine of FIG. 2 with the cover removed, in accordance with another embodiment of the present disclosure.

Referring now to FIG. 6, the platform 316 may include a console tilt pivot opening 610, a console tilt fastener 612, a bushing 614, a plurality of tilt adjustment selection holes 616, a curved slot 618, a guidepost 620, a lever pivot opening 622, and a lever fastener 624. The console tilt pivot opening 610 may be disposed in the platform 316. The console tilt fastener 612 may be located in the console tilt pivot opening 610 and rotatably engaged with the console 210. The bushing 614 may be disposed about the console tilt fastener 612 and may also be rotatably engaged with the console 210 to moderate tilting between the console 210 and the platform 316. The guidepost 620 may be operatively associated with the console 210. The curved slot 618 may be disposed in the platform 316 and may slidably receive the guidepost 620, thus restricting angular tilting movement between the platform 316 and the console 210. The plurality of tilt adjustment selection holes 616 may also be disposed in the platform 316 and may be adapted to selectively receive first and second locking pins 512, 514, thus allowing the console 210 to be tilted relative to and secured to the platform 316. The lever pivot opening 622 may be disposed in the platform 316 as well and may rotatably receive the lever fastener 624. Further, the lever fastener 624 may be operatively associated with the lever 428. Additional structures and connections related to the lever 428 are more fully described by FIG. 7 below.

Figure 7:
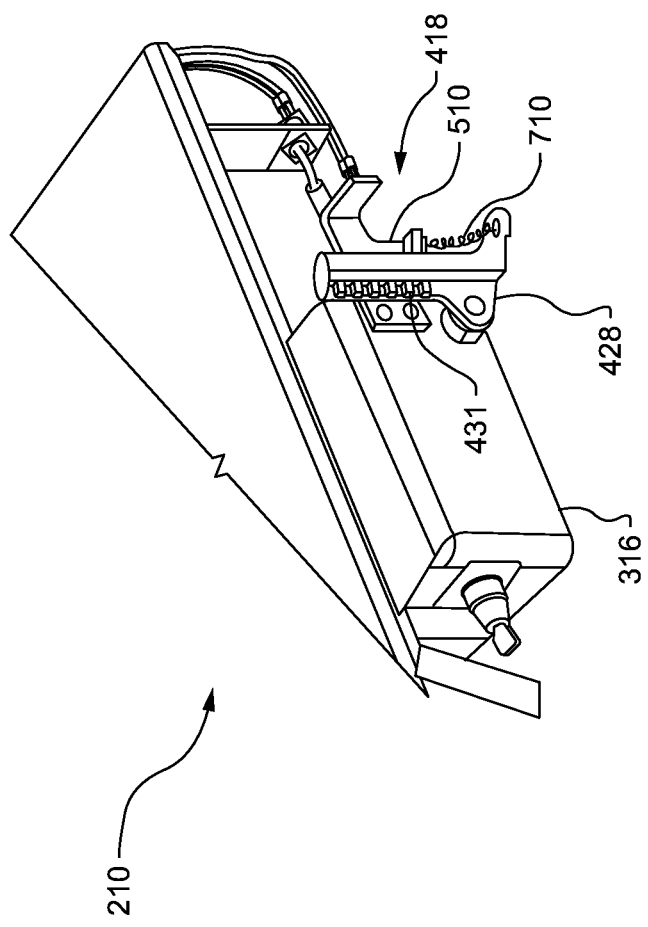
FIG. 7 is another perspective view of the console of the operator station of the machine of FIG. 2 with the cover removed, in accordance with an embodiment of the present disclosure.

Looking at FIG. 7, the vertical adjustment assembly 418 may further include a spring 710. The spring 710 may be operatively associated with the lever 428 and the vertical adjustment bracket 510. Thus, upon releasing the vertical adjustment finger lever 228 of FIG. 2, the lever 428 may be pulled by the spring 710 to engage with the rail 318, as better shown in FIG. 4. Further structures related to the rail 318 and to vertical adjustment of the operator station 120 are more fully described by FIG. 8 below.

Figure 8:
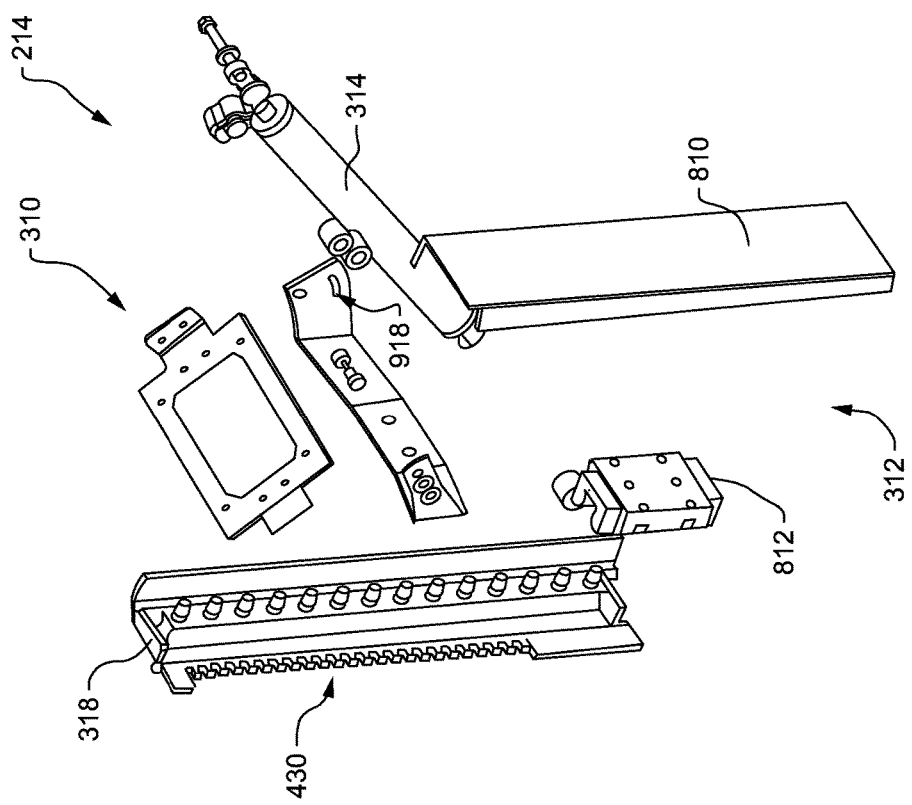
FIG. 8 is an exploded view of a support assembly of the operator station of the machine, in accordance with an embodiment of the present disclosure.

Referring now to FIG. 8, the slider assembly 312 may include a slider plate 810 and a slider block 812. The slider block 812 may be operatively associated with the slider plate 810 and the suspension mechanism 314. The slider plate 810 may be operatively associated with the display mounting assembly 310 and with the platform 316, as shown in FIG. 3. In some embodiments, the slider plate 810 may be slidably associated with the display mounting assembly 310. Additional structures related to the display mounting assembly 310 and to the suspension mechanism 314 are more fully described by FIGS. 9-10.

Figure 9:
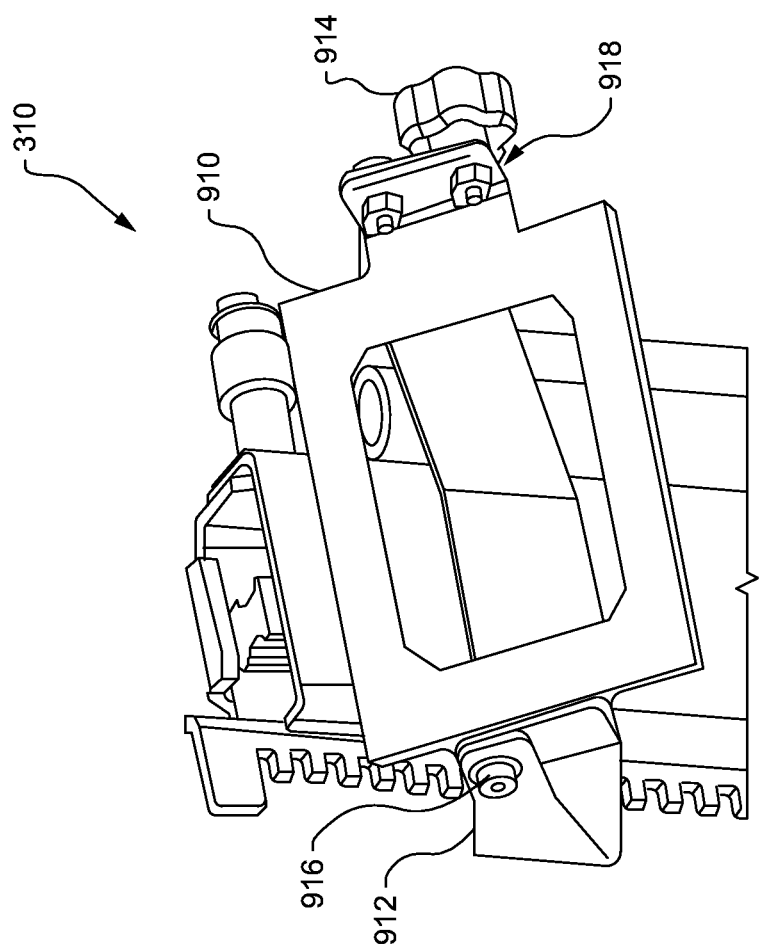
FIG. 9 is a perspective view of a display mounting assembly of the support assembly of the operator station of the machine, in accordance with an embodiment of the present disclosure.

The display mounting assembly 310 may further include a display bracket 910, a display arm 912, a set knob 914, and a bushing 916, as shown best in FIG. 9. The display bracket 910 may be rotatably engaged with the display arm 912 and may be operatively associated with the display 212 (not shown in FIG. 9). The bushing 916 may be disposed between the display bracket 910 and the display arm 912 to moderate the relative rotation between the display bracket 910 and the display arm 912. The set knob 914 may be threadably engaged with the display bracket 910 and selectively slidably engaged with the display arm 912 via a crescent slot 918 (best shown in FIG. 8). It should be understood that tightening the set knob 914 rotationally secures the display bracket 910 against the display arm 912.

Figure 10:
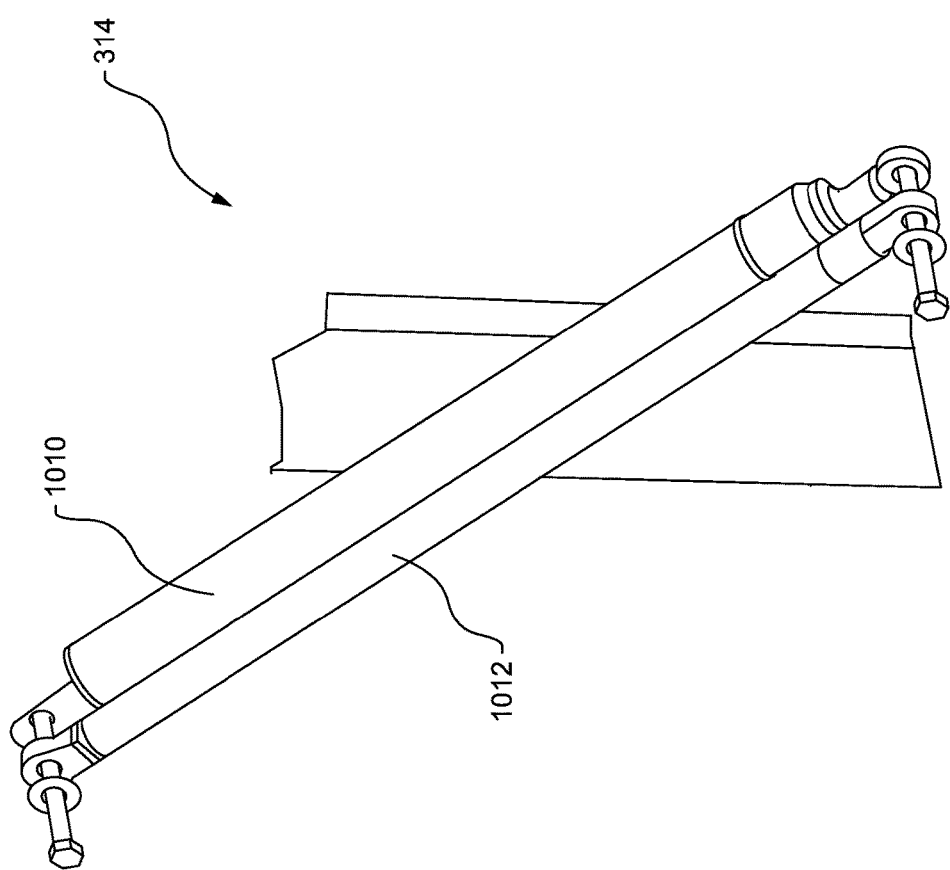
FIG. 10 is a perspective view of a suspension mechanism of the support assembly of the operator station of the machine, in accordance with an embodiment of the present disclosure.

Focusing now on FIG. 10, the suspension mechanism 314 may include a spring strut 1010 and a damper 1012. In some embodiments, the damper 1012 may be a gas damper. In other embodiments, the damper 1012 may be an oil damper. It should be understood that in addition to being separate parts as depicted in FIG. 10, the spring strut 1010 and the damper 1012 may be integral.

INDUSTRIAL APPLICABILITY

In operation, the foregoing disclosure finds utility in various industrial applications, such as, but not limited to, construction, road building, agriculture, mining, demolition, excavation, and transportation. In particular, the disclosed machine operator station may be applied to construction equipment and any other machine equipped with a control system. By using the disclosed machine and associated operator station, operators may run such machines for longer periods and inadvertent incorrect commands to the machine may be prevented, thereby reducing work disruptions and work stoppages. Moreover, increasing the period for which an operator may safely run the machine may reduce work time lost to operator changeovers. The disclosed machine and operator station may thus increase worksite efficiency and provide cost saving measures.

Figure 11:
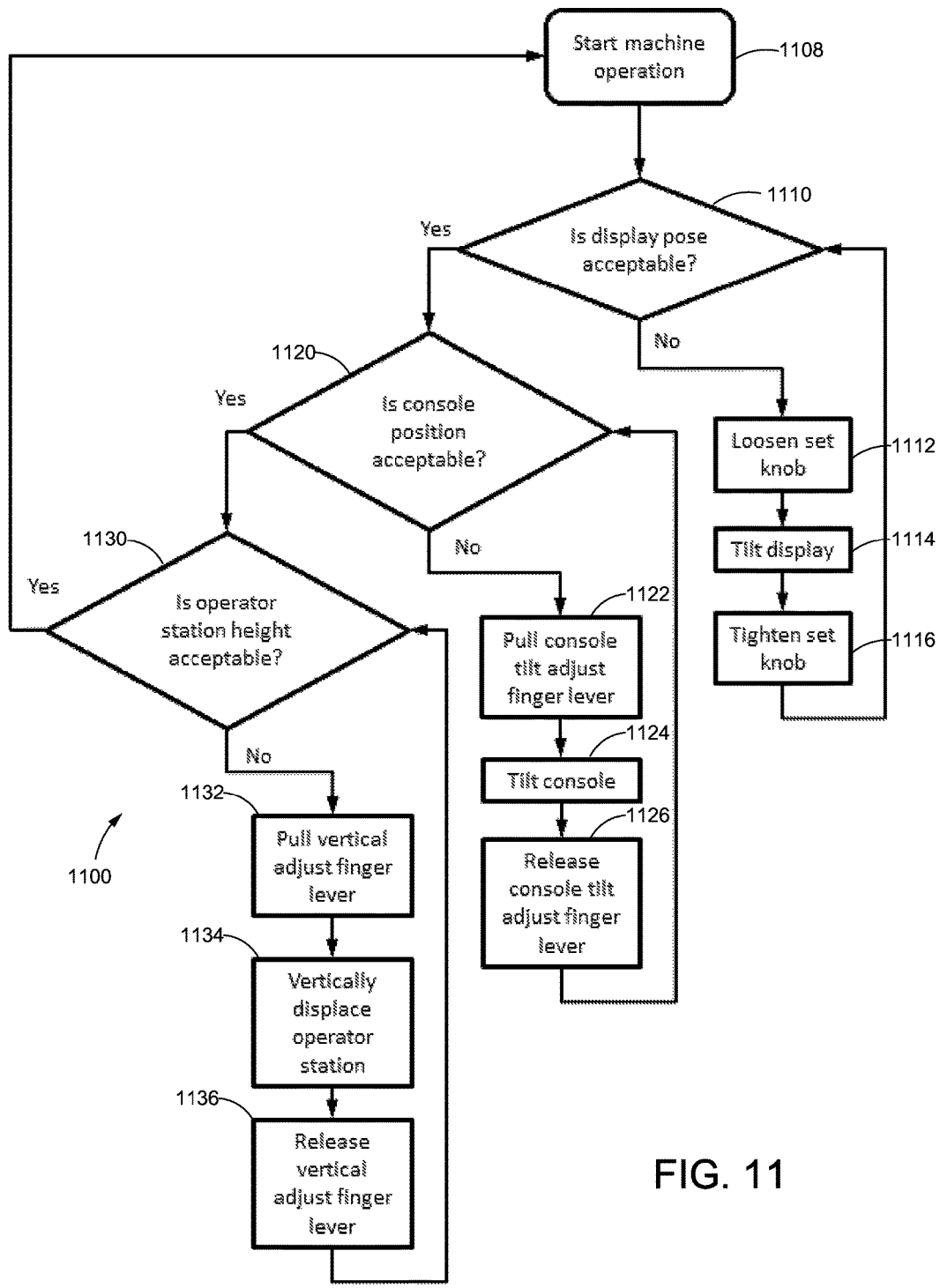
FIG. 11 is a flow chart depicting a sample sequence, in accordance with an embodiment of the present disclosure.

FIG. 11 is a flow diagram showing a method 1100 of customizing an operator station 120. More specifically, at stage 1108, an operator may start a machine operation. At stage 1110, the operator may decide whether the display pose is acceptable. If the operator finds the display pose unacceptable, a set knob 914 may be loosened at stage 1112. Following this, the display 212 may be tilted at stage 1114. Then, the set knob 914 may be tightened to secure the display pose at stage 1116. If, however, the operator finds the display pose acceptable at stage 1110, the method 1100 may advance to another decision at a stage 1120.

At stage 1120, an operator may decide whether the console position is acceptable. If the operator finds the console position unacceptable, a console tilt adjustment finger lever 230 may be pulled at stage 1122. Next, the console 210 may be tilted at stage 1124. After that, the console tilt adjustment finger lever 230 may be released to secure the console position at stage 1126. However, if the operator finds the console position acceptable at stage 1120, the method 1100 may progress to another decision at a stage 1130.

At stage 1130, an operator may decide whether the operator station height is acceptable. If the operator finds the operator station height unacceptable, a vertical adjustment finger lever 228 may be pulled at stage 1132. Following this, the operator station 120 may be vertically displaced at stage 1134. Then, the vertical adjustment finger lever 228 may be released to secure the operator station height at stage 1136. But, if the operator finds the operator station height acceptable at stage 1130, the method 1100 may return to stage 1108 where the operator may comfortably commence operation of the machine 110.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. An operator station, comprising:
   a console including a lever and at least one locking pin;
   a rail selectively engaged with the lever;
   a slider assembly slidably engaged with the rail;
   a suspension mechanism operatively associated with the slider assembly and the rail;
   a platform operatively associated with the slider assembly, tiltably associated with the console, and slidably selectively engaged with the at least one locking pin;
   a display mounting assembly operatively associated with the slider assembly; and
   a display operatively associated with the display mounting assembly.

2. The operator station of claim 1, wherein the console further includes:
   a vertical adjustment finger lever;
   a first pull cable operatively associated with the vertical adjustment finger lever and the lever;
   a vertical adjustment bracket operatively associated with the first pull cable; and
   a spring operatively associated with the lever and the vertical adjustment bracket.

3. The operator station of claim 1, wherein the console further includes:
   a console tilt adjustment finger lever;
   a second pull cable operatively associated with the console tilt adjustment finger lever;
   a yoke operatively associated with the second pull cable and the at least one locking pin;
   a yoke bracket operatively associated with the yoke;
   a third pull cable operatively associated with the yoke and a second locking pin; and
   a console tilt bracket operatively associated with the third pull cable.

4. The operator station of claim 1, wherein the slider assembly includes:
   a slider block slidably engaged with the rail and operatively engaged with the suspension mechanism; and
   a slider plate slidably engaged with the rail and operatively engaged with the slider block, the platform, and the display mounting assembly.

5. The operator station of claim 1, wherein the suspension mechanism includes a spring strut and a damper.

6. The operator station of claim 5, wherein the spring strut and the damper are integral.

7. The operator station of claim 1, wherein the platform includes:
   at least one console tilt pivot opening;
   a console tilt fastener located in the console tilt pivot opening and rotatably engaged with the console;
   a plurality of tilt adjustment selection holes adapted to slidably receive the at least one locking pin;
   a lever pivot opening; and
   a lever fastener located in the lever pivot opening and rotatably associated with the lever.

8. The operator station of claim 7, wherein the platform further includes:
   a bushing disposed about the console tilt fastener;
   at least one curved slot; and
   a guidepost located in the curved slot, slidably engaged with the platform, and operatively associated with the console.

9. The operator station of claim 1, wherein the display mounting assembly includes:
   a display arm having a crescent slot;
   a display bracket rotatably associated with the display arm; and
   a bushing located between the display arm and the display bracket;
   a set knob threadably engaged with the display bracket, located in the crescent slot, and slidably engaged with the display arm.

10. The operator station of claim 1, wherein the console further includes:
    at least one joystick mount; and
    at least one modular joystick removably associated with the joystick mount.

* * * * *